(12) United States Patent
Kudo et al.

(10) Patent No.: US 6,715,463 B2
(45) Date of Patent: Apr. 6, 2004

(54) IN-CYLINDER FUEL INJECTION ENGINE AND THE METHOD OF CONTROLLING THE ENGINE

(75) Inventors: Shinya Kudo, Tokyo (JP); Akira Akimoto, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/457,455

(22) Filed: Jun. 10, 2003

(65) Prior Publication Data

US 2003/0230275 A1 Dec. 18, 2003

(30) Foreign Application Priority Data

Jun. 12, 2002 (JP) ...................................... P2002-171480

(51) Int. Cl.[7] ................................................. F02B 17/00
(52) U.S. Cl. ...................... 123/261; 123/276; 123/295; 123/299; 123/305
(58) Field of Search ................................ 123/261, 276, 123/295, 299, 305

(56) References Cited

U.S. PATENT DOCUMENTS

| | | | | |
|---|---|---|---|---|
| 4,913,111 A | * | 4/1990 | Ariga | 123/261 |
| 5,806,473 A | * | 9/1998 | Kometani et al. | 123/299 |
| 5,908,018 A | * | 6/1999 | Suzuki | 123/305 |
| 6,263,855 B1 | * | 7/2001 | Kobayashi et al. | 123/295 |
| 6,532,933 B1 | * | 3/2003 | Tanaka et al. | 123/305 |
| 6,588,396 B1 | * | 7/2003 | Cleary et al. | 123/276 |
| 2002/0038645 A1 | * | 4/2002 | Chmela et al. | 123/276 |
| 2003/0066508 A1 | * | 4/2003 | Nakayama et al. | 123/295 |

FOREIGN PATENT DOCUMENTS

| | | |
|---|---|---|
| JP | 11-223127 | 8/1999 |
| JP | 2000-248944 | 9/2000 |
| JP | 2000-265842 | 9/2000 |

* cited by examiner

*Primary Examiner*—Erick Solis
(74) *Attorney, Agent, or Firm*—McGinn & Gibb, PLLC

(57) ABSTRACT

The in-cylinder fuel injection engine is characterized in that fuel is injected into the combustion chamber in two directions. When the homogeneous charge combustion is performed, a first spray block of fuel is injected inside of the cavity and a second spray block of fuel is injected outside of the cavity. When the stratified charge combustion is performed, both spray blocks are injected inside of the cavity.

10 Claims, 17 Drawing Sheets

IN-CYLINDER FUEL INJECTION ENGINE AND THE METHOD OF CONTROLLING THE ENGINE

BACKGROUND OF THE INVENTION

1. Field of the Invention

The present invention relates to an in-cylinder fuel injection engine in which homogeneous mixture combustion or stratified charge combustion is selectively performed according to operating conditions of the engine and to the control method thereof.

2. Discussion of Prior Arts

The in-cylinder fuel injection engine is an engine in which fuel is injected directly into the combustion chamber and so-called lean burn is realized by rapidly mixing fuel with air and forming combustible air-fuel mixture around a spark plug, intending the improvement of fuel economy and the stability of combustion in light loads and low speeds condition of the engine.

A Japanese Patent Application Laid-open No. Toku-Kai-Hei 11-223127 (prior art 1) discloses an in-cylinder fuel injection engine wherein a spark plug is disposed in the midst of a combustion chamber of a penthouse-roof type and a cavity is provided on a top face of a piston in a state offset on the intake port side. In this prior art, the direction of fuel injected from an fuel injector is inclined diagonally and downwardly with respect to a center axis of a cylinder and the profile of spray distribution of injected fuel is fan-shaped so as to rapidly diffuse fuel into the combustion chamber.

On the other hand, Japanese Patent Applications Laid-open No. Toku-Kai 2000-265842 (prior art 2) and No. Toku-Kai 2000-248944 (prior art 3) disclose a piston structure in which an inner wall surface of a cavity formed on the top face of a piston is shaped into an overhang configuration. In these prior arts, when a spray block of fuel collides against the inner wall surface of the cavity, a swirl is generated by the penetration of the fuel injector. As a result, particularly under light loads, the spray block of fuel is flung up towards an electrode of a spark plug to form a locally rich air-fuel mixture around the electrode of the spark plug, whereby misfiring can be prevented and the combustion stability is enhanced.

The combustion strategy of the aforesaid in-cylinder fuel injection engine has two modes, homogeneous mixture combustion and stratified charge combustion either of which is selected according to operating conditions of the engine. When the engine operates at heavy loads and high speeds, namely, in a stoichiometric air-fuel ratio condition, a uniform mixture is formed in the combustion chamber and so-called homogeneous mixture combustion is performed. To enhance the uniformity of mixture, fuel is sprayed during the intake stroke.

On the other hand, when the engine operates at light loads and low speeds like idle speeds, namely, in a lean air fuel ratio condition (lean burn zone of air-fuel ratio), air-fuel mixture is stratified in the combustion chamber and so-called stratified charge combustion takes place. In this stratified charge combustion strategy, fuel is sprayed at a latter stage of the compression stroke. The fuel injected from the fuel injector is introduced to the cavity formed on the top surface of the piston and streams towards the electrode of the spark plug. Thus, an ignitable mixture gas is formed in the vicinity of the electrode and is ignited by the spark plug at an appropriate timing.

However, when the homogeneous charge combustion takes place in a high load and high speed operating region of the engine, the prior art 1 has a difficulty of enhancing a disperseability of fuel and an air utilization ratio. As illustrated in FIG. 12, a fuel injector 12 is disposed on an intake side of a combustion chamber 8 of an engine E and fuel is injected from the fuel injector 12 in a spray block F. Further, a cavity 5 is formed on a top face 4a of a piston 4 in a position offset from a central axis of a cylinder 1 to the intake side. A central axis Q of the spray block F shows an injection direction of fuel of the fuel injector 12, being directed to the cavity 5. Consequently, when the spray block F is injected from the fuel injector 12, almost all quantity of fuel is injected toward inside of the cavity 5.

When the piston 4 descends from the top dead center in a state while an intake port 9a is opened by an intake valve 10a and an exhaust port 9b is closed by an exhaust valve 10b, the fuel spray block F is affected by an air stream of the intake air (indicated by a bold arrow of FIG. 12). Hence, when the piston 4 goes up from the bottom dead center, the fuel spray block F is involved in the air stream of the intake air, as illustrated in FIG. 13. As a result, as shown in FIG. 14, the spray block F stays inside of the cavity 5 and more of the rich fuel tends to exist on the intake side. As a result, since the disperseability of fuel and the air utilization ratio can not be enhanced adequately, miscellaneous adverse effects such as loss of thermal efficiency, power-downing and exacerbated fuel economy and the like are caused.

On the other hand, when the stratified charge combustion takes place in a low load and low speed operating region of the engine, fuel is injected inside the cavity 5 when the cavity 5 comes close to the fuel injector 12 at the latter stage of the compression stroke. At this moment, as shown in FIG. 15, most of fuel is reflected as a main spray block F towards an inner wall surface 5a on the exhaust side of the cavity 5, however the rest part of fuel is reflected as a residual spray block F0 towards an inner wall surface 5b on the intake side of the cavity 5. As a result, the residual spray block F0 is reflected in an opposite direction of the main spray block F and both spray blocks are separated from each other. When the spark plug is ignited in this state, the flame propagation does not reach the residual spray block F0 and as a result the residual fuel spray F0 stays unburned in the combustion chamber, this incurring exacerbated exhaust emissions and fuel economy.

To solve the problem, it is considered that the ignition timing is slightly retarded. That is, during the retarded ignition timing, the main spray block F is diffused towards the intake side and joins with the residual spray block F0 in the vicinity of the intake port. The ignition takes place when both spray blocks meet together. However, when the main spray block F joins with the residual spray block F0, there is a possibility that a ring-shaped stream of the mixture gas is generated by the joining of both spray blocks. Then, a central portion of the ring-shaped stream tends to remain unburned. Further, the fuel diffused on the exhaust side also tends to remain unburned. Further, since the main spray block around the electrode 11a of the spark plug has a stream towards the intake side, the stability of ignition and the stability of combustion are exacerbated.

On the other hand, when the stratified charge combustion takes place in a high speed condition of the engine, it is difficult to find an appropriate ignition timing and as a result the thermal efficiency goes down.

Further, with respect to the prior arts 2 and 3, as shown in FIG. 17, an inner wall surface 5a opposite to the direction the fuel injection of the cavity 5 has an overhang configuration. Hence, when the fuel spray block F collides with the inner wall surface 5a of the cavity 5, the greater part of the spray block F stays within the cavity 5. As a result, the homogeneous charge combustion tends to produce a lean fuel distribution on the exhaust side.

SUMMARY OF THE INVENTION

It is an object of the present invention to provide an in-cylinder fuel injection engine enhanced in thermal efficiency, combustion stability and emissions performance when the stratified charge combustion is perfomed, and improved in thermal efficiency, power output performance and fuel economy when the homogeneous charge combustion is performed.

In order to attain the object, the in-cylinder fuel injection engine comprises a cavity provided on a top surface of a piston on an intake side, a fuel injector for injecting fuel in two directions, a first injection direction and a second injection direction and injection timing control means. That is, the fuel injector forms two fuel spray blocks, one spray block directed to the first injection direction and the other spray block directed to the second injection direction. The injection timing control means controls an injection timing so as to direct the first injection direction to the cavity and to direct the second injection direction to the top surface of the piston outside of the cavity, when the piston is during the intake stroke and positioned at a specified crank angle, preferably between 130° and 160°, after top dead center on a bottom dead center side and for controlling the injection timing so as to direct both of the first injection direction and the second injection direction to the cavity, when the piston is at a latter stage of the compression stroke.

According to a second aspect of the invention, a fuel injector forms two groups of fuel spray blocks, a first group of spray blocks including a plurality of spray blocks and a second group of spray blocks including a plurality of spray blocks. When the homogeneous charge combustion is performed, the first group of spray blocks is injected inside of the cavity and the second group of spray blocks is injected outside of the cavity. When the stratified charge combustion is performed, both groups of spray blocks are injected inside of the cavity.

DETAILED DESCRIPTION OF THE PREFERRED EMBODIMENT

Figure 1:
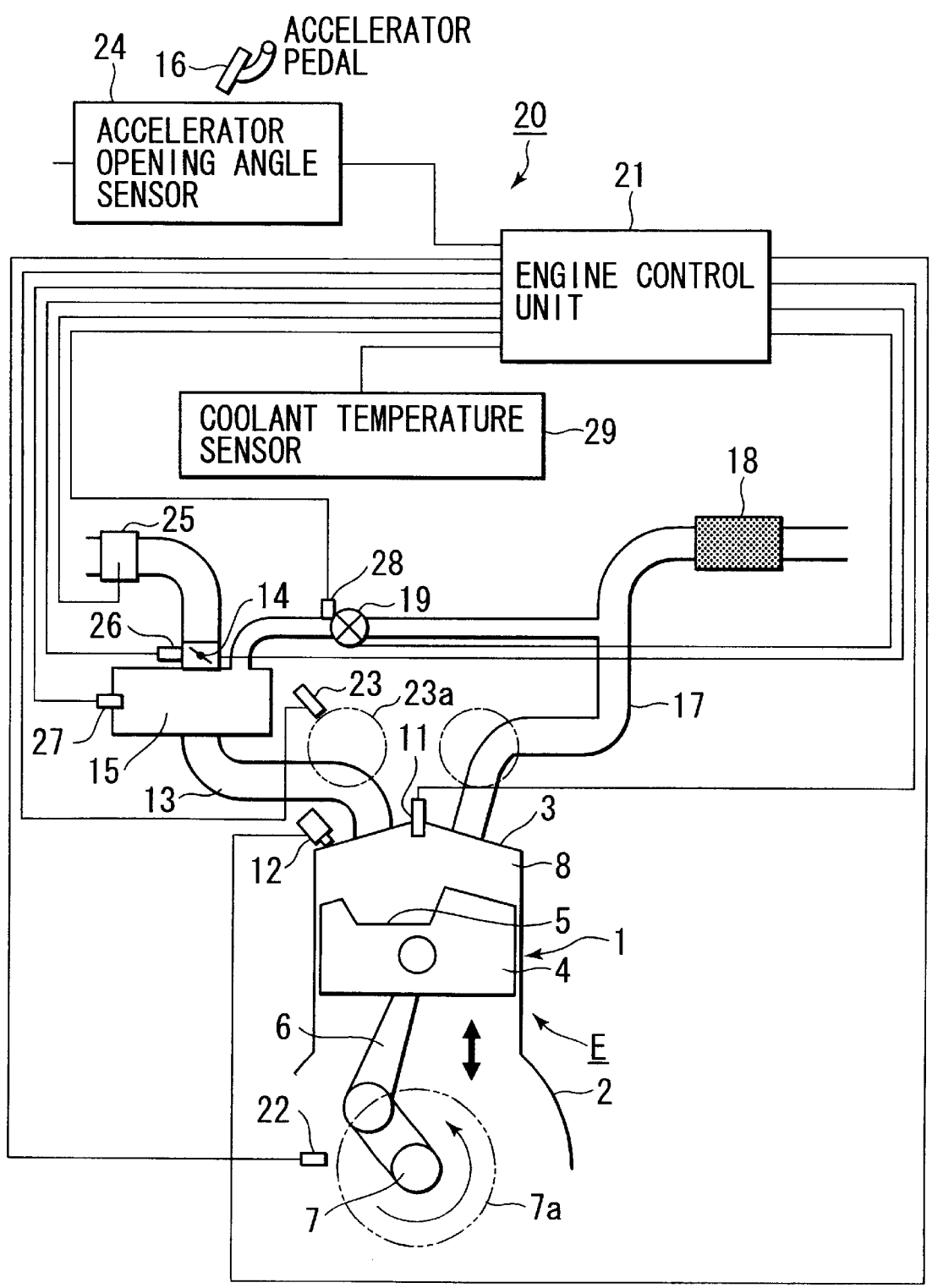
FIG. 1 is a schematic diagram showing an in-cylinder fuel injection engine according to the present invention.
Figure 2:
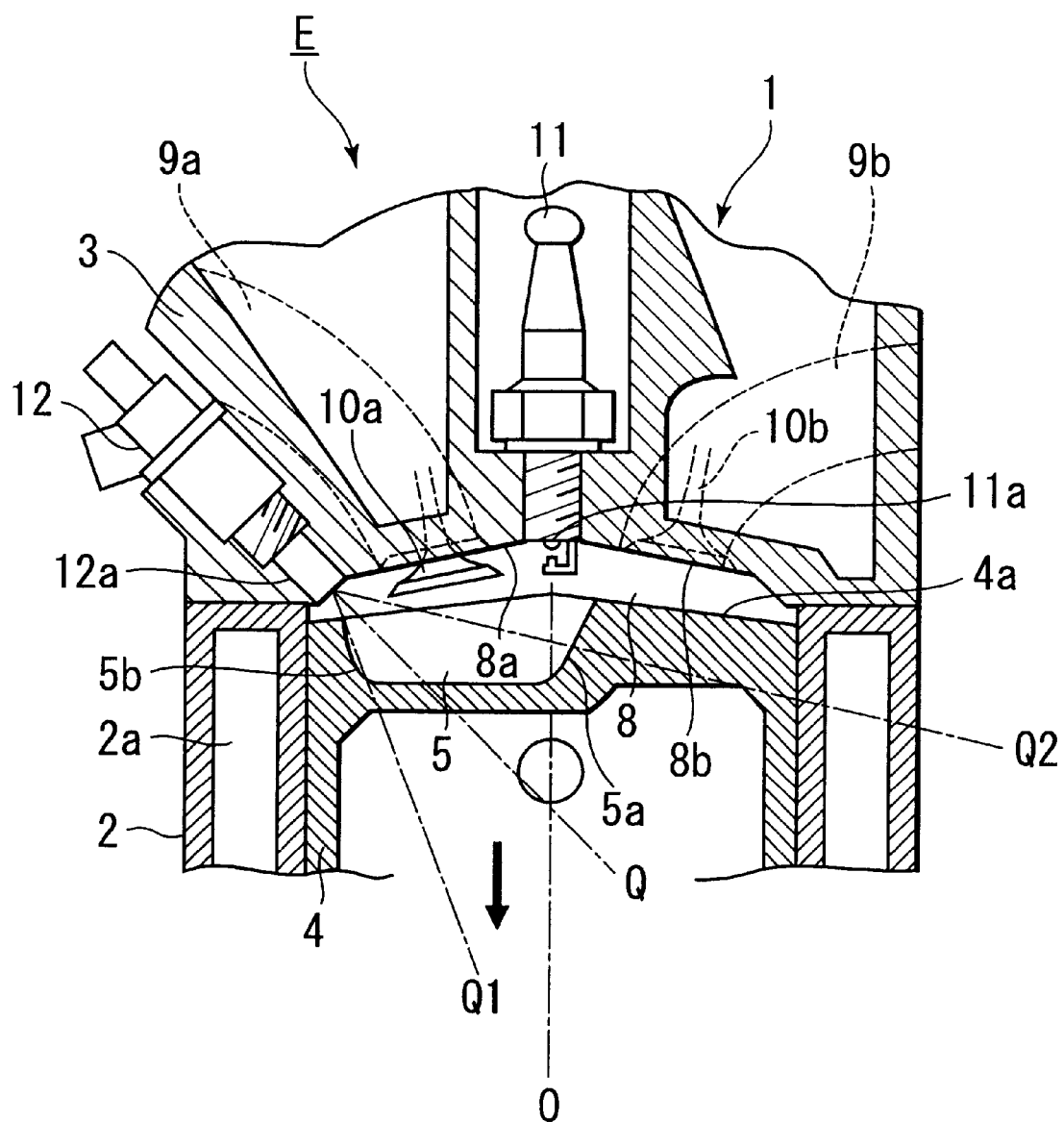
FIG. 2 is a schematic sectional view showing a combustion chamber at an initial stage of the intake stroke.

Referring now to FIGS. 1 and 2, an engine E is primarily constituted by a cylinder 1, a cylinder block 2, a cylinder head and a piston 4. The piston 4 is reciprocatably provided in the cylinder 1 and has a cavity 5 on a top surface 4a thereof in a position offset on an intake side. The piston 4 is interlocked with a crankshaft 7 through a connecting rod 6. In the cylinder 1, a combustion chamber 8 of a penthouse-roof type is formed between an inner wall of the cylinder head 3 and a top surface 4a of the piston 4. There is provided an intake valve 10a for opening and closing an intake port 9a on a slanted roof surface 8a on an intake side of the combustion chamber 8 and also there is provided an exhaust valve 10b for opening and closing an exhaust port 9b on a slanted roof surface 8b on an exhaust side of the combustion chamber 8. A spark plug 11 is mounted on a central roof surface between the intake valve 10a and the exhaust valve 10b of the combustion chamber 8 with an electrode 11a exposed to the combustion chamber 8. Further, a fuel injector 12 is mounted on the slanted roof surface 8a of the combustion chamber 8 on the intake side to spray pressurized fuel (gasoline). The fuel injector 12 is an electromagnetic valve and disposed in the combustion chamber 8 such that a central axis Q thereof is inclined downward to a central axis O of the cylinder 1. As a result, fuel is injected directly into the combustion chamber 8 from the intake port 9a side to the exhaust port 9b side.

The intake port 9a is connected with an intake manifold 13 for supplying air to the combustion chamber 8. The intake manifold 13 has a throttle valve 14 for regulating the quantity of air sucked through an air cleaner (not shown) and has an air chamber 15 downstream of the throttle valve 14. The throttle valve 14 is driven by an electric motor (not shown) without having a mechanical linkage with an accelerator pedal 16. An opening angle of the throttle valve 14 is established by an output signal from a control unit 21 of an engine control circuit 20 which will be described hereinafter. On the other hand, the exhaust port 9b is connected with an exhaust manifold 17 for discharging exhaust gas remaining in the combustion chamber 8 after the combustion stroke. The exhaust manifold 17 is connected with a catalytic converter 18 to purify the exhaust gas. The air chamber 15 of the intake manifold 13 communicates with the exhaust manifold 17 through an EGR valve 19 which is driven by a stepper motor (not shown). An opening angle of the EGR valve 19 is established by an output signal from the control unit 21. The opening angle of the EGR valve 19 is so regulated as to supply an appropriate amount of inert gas to the intake manifold 13 and to decrease the combustion temperature in the combustion chamber 8 and as a result nitrogen oxides emission can be reduced.

The engine E is connected with the engine control circuit 20 having the control unit 21. The control unit 21 is primarily constituted by a micro-computer in which a fuel injection amount, a fuel injection timing, an ignition timing, a throttle opening angle, an EGR opening angle and the like, are calculated. Control signals indicative of these calculated control variables are outputted from the control unit 21 to miscellaneous actuators.

The control unit 21 inputs sensor signals from miscellaneous sensors 22 to 29. A crank angle sensor 22 is disposed in the vicinity of an outer periphery of a crank rotor 7a which rotates integrally with the crankshaft 7 to detect crank angles. The control unit 21 controls a series of combustion stroke in the engine E based on the sensor signal from the crank angle sensor 22. A cam angle sensor 23 is disposed in the vicinity of a cam mechanism 23a for opening and closing the intake valve 10a to detect a cam angle. The control unit 21 controls valve opening and closing conditions of the intake valves 10a based on the sensor signal from the cam angle sensor 23. An accelerator opening angle sensor 24 is of a potentiometer type and is disposed in the vicinity of the accelerator pedal 16 to detect load conditions of the engine. The control unit 21 controls a load required by a vehicle driver based on a sensor signal from the accelerator opening angle sensor 24. Air flow sensor 25 is of a hot wire type or hot film type and is disposed immediately downstream of the air cleaner (not shown) to detect an intake air amount. Further, a throttle opening angle sensor 26 is disposed in the neighborhood of the throttle valve 14 to detect a throttle opening angle. A manifold pressure sensor 27 is disposed in the air chamber 15 to detect a pressure in the air chamber 15. An EGR opening angle sensor 28 is disposed in the EGR valve 19 provided between the air chamber 15 and the exhaust manifold 17 to detect an EGR opening angle of the EGR valve 19. The control unit 21 controls a mixing rate of the inert gas to be supplied to the intake manifold 13. A coolant temperature sensor 29 is disposed in a water jacket 2a formed around the combustion chamber 8 to detect a water temperature of the water jacket 2a. The control unit 21 controls an injection quantity, an ignition timing and the like based on a sensor signal from the coolant temperature sensor 29.

According to a first embodiment of the present invention, fuel is injected from an injection nozzle 12a of the fuel injector 12 in two directions, Q1 and Q2.

The first injection direction Q1 is directed downward with respect to the central axis Q of the fuel injector 12 and the second injection direction Q2 is directed upward with respect to the central axis Q.

Figure 3:
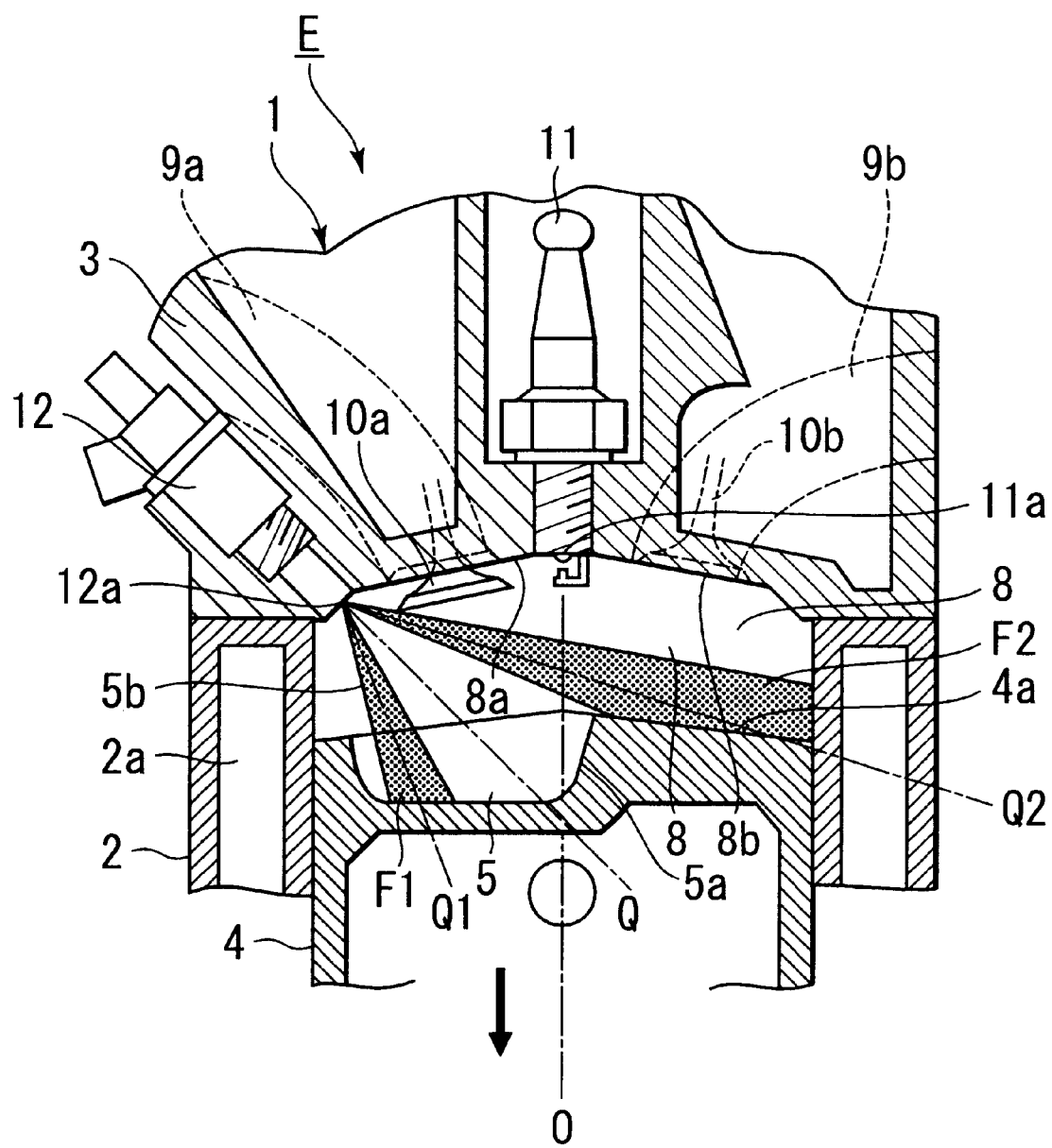
FIG. 3 is a schematic sectional view showing a combustion chamber, particularly, a condition of fuel injected in a high load and high speed operating region.

FIG. 3 is a sectional view showing a condition of injected fuel in the homogeneous charge combustion available in high loads and high speeds operating region. The timing of fuel injection is established to an instance at the initial through middle stage of the intake stroke. This timing of the middle stage of the intake stroke corresponds to 100° to 180°, preferably 130° to 160°, for example 130° in terms of the crank angle. In other words, the crank angle of 130° indicates a position where the piston 4 is located on the bottom dead center side. Further, the fuel injected from the injection nozzle 12a of the fuel injector is divided into two spray blocks, a main spray block F1 injected in the direction of the central axis Q1 and a subsidiary spray block F2 injected in the direction of the central axis Q2. The central axis Q1 is directed to the inner wall of the cavity 5 at a relatively sharp angle and the central axis Q2 is directed to the top surface 4a of the piston 4 at a relatively dull angle. That is, the main spray block F1 is sprayed towards the inner surface of the cavity 5 rather perpendicularly thereto and the subsidiary spray block F2 is sprayed over the cavity 5 obliquely towards the top surface 4a of the piston 4 on the exhaust side of the combustion chamber 8.

Figure 4:
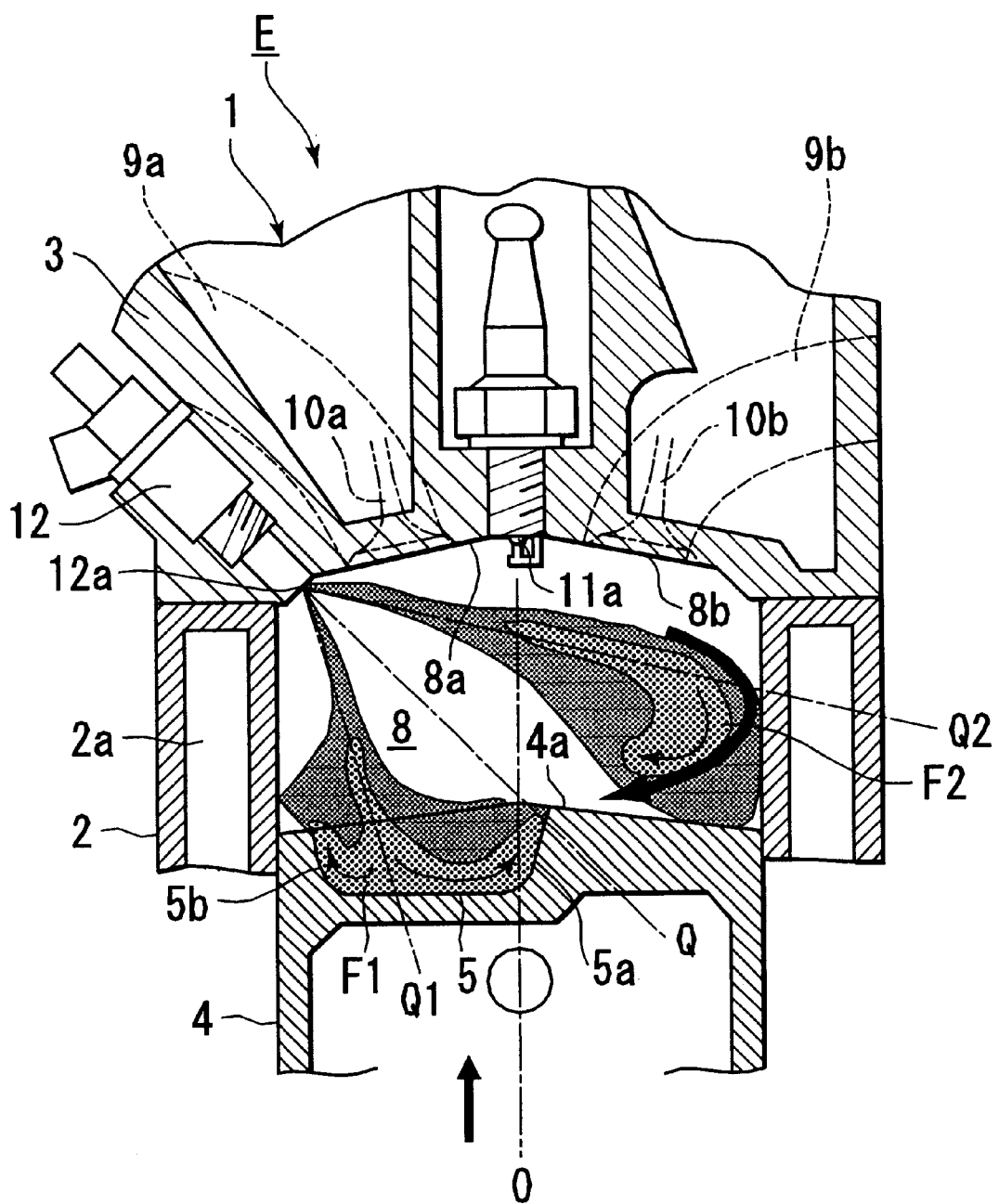
FIG. 4 is a schematic sectional view showing a combustion chamber, particularly a behavior of a fuel spray block at an initial stage of the compression stroke in the homogeneous charge combustion.
Figure 5:
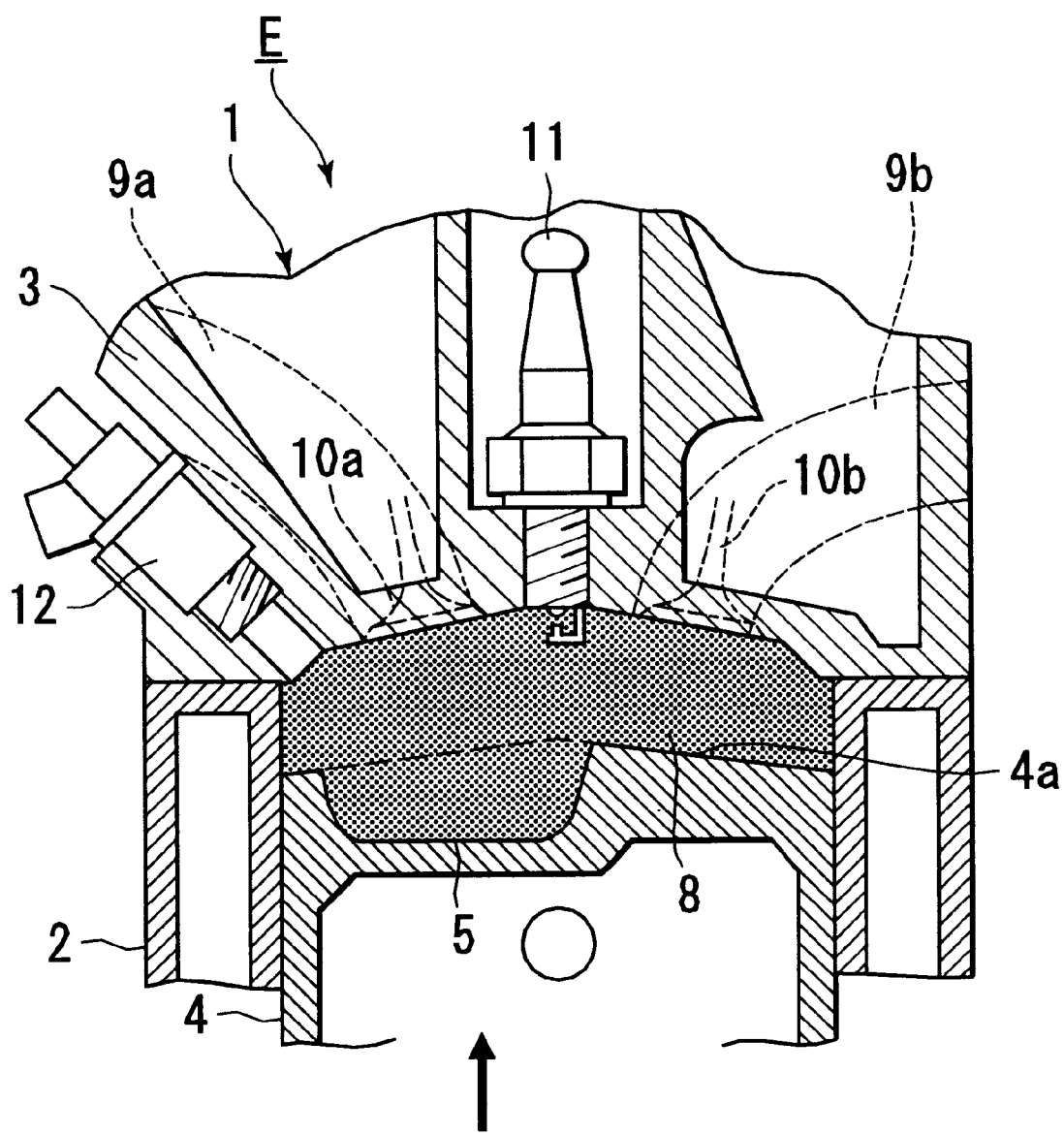
FIG. 5 is a schematic sectional view showing a combustion chamber, particularly a behavior of a fuel spray block at a latter stage of the compression stroke in the homogeneous charge combustion.

FIG. 4 is a sectional view showing a behavior of a fuel spray block in the homogeneous charge combustion and FIG. 5 is a sectional view showing a behavior of a fuel spray block at a latter stage of the compression stroke in the homogeneous charge combustion. As illustrated in FIG. 4, when fuel is injected to the combustion chamber 8 at the middle stage of the intake stroke, the main spray block F1 is diffused in the cavity 5 and in an upper space of the cavity 5, thereby a rich air-fuel mixture is formed on the intake side with respect to a central axis O of the cylinder 1.

On the other hand, the subsidiary spray block F2 sprayed to the exhaust side of the combustion chamber 8 is caught by an air stream (illustrated by a bold arrow of FIG. 4) towards the central part of the combustion chamber 8 and diffused. Further, since the fuel injection takes place at a rather early stage, the mixing of air and fuel is expedited. As a result, a rich air-fuel mixture is formed also on the exhaust side with respect to the central axis O of the cylinder 1. Accordingly, as shown in FIG. 5, a rich uniform air-fuel mixture is formed in the overall combustion chamber 8 by the main spray block F1 and the subsidiary spray block F2 at the latter stage of the compression stroke. As a result, the diffuseability of fuel and the air utilization ratio are enhanced and power output performance and fuel economy can be improved due to the elimination of a loss of thermal efficiency.

Figure 6:
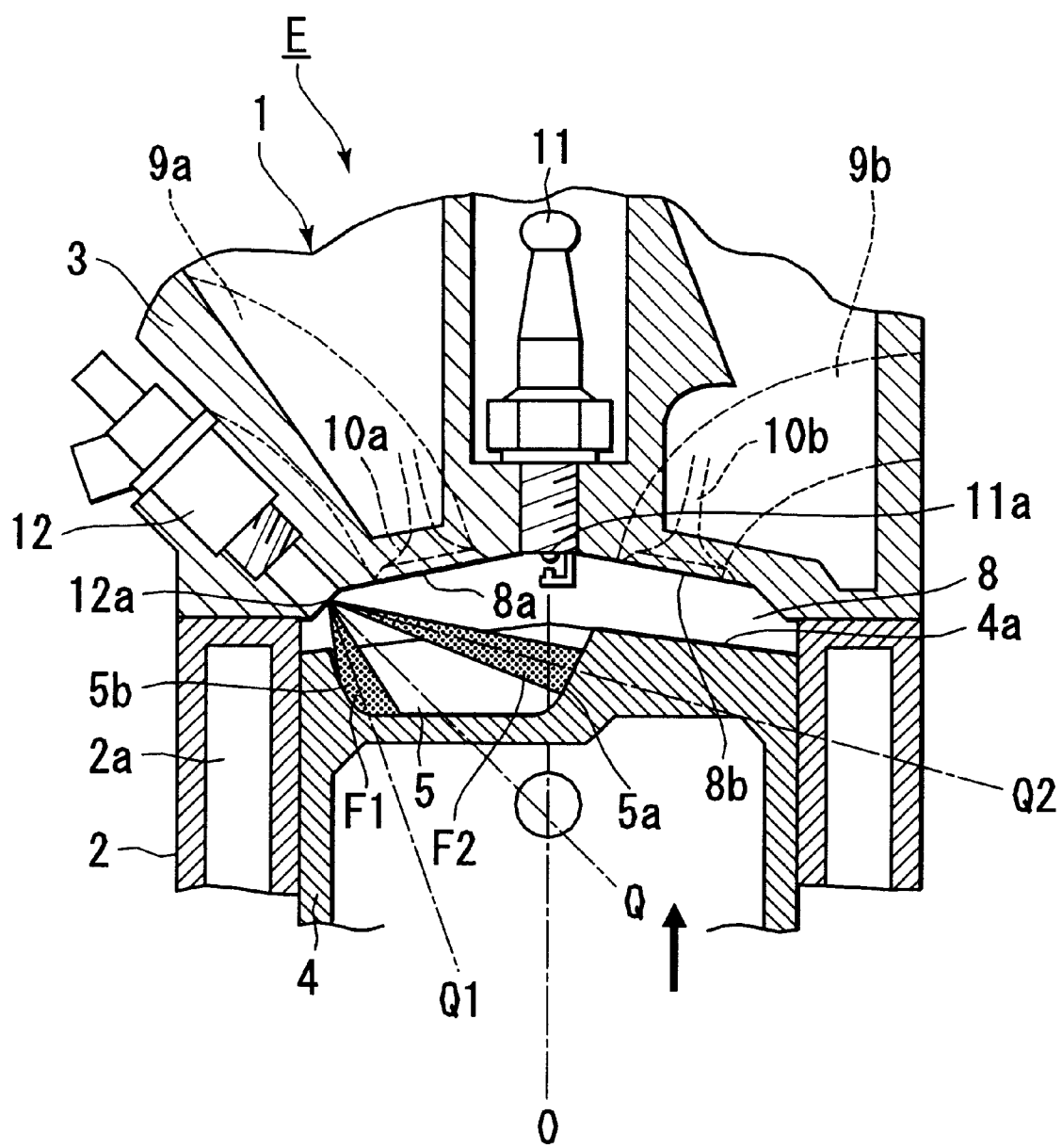
FIG. 6 is a schematic sectional view showing a combustion chamber, particularly a condition of fuel injected in the homogeneous charge combustion in a low load and low speed operating region.

FIG. 6 is a sectional view showing a condition of fuel injection in the stratified charge combustion available in low loads and low speeds operating region. The timing of fuel injection in this stratified charge combustion is established to an instance at the latter stage of the compression stroke. Therefore, when fuel is injected from the injection nozzle 12a of the fuel injector 12 at this timing, the main spray block F1 and the subsidiary spray block F2 are directed to the inner wall of the cavity 5 along the central axis Q1 and the central axis Q2, respectively.

Figure 7:
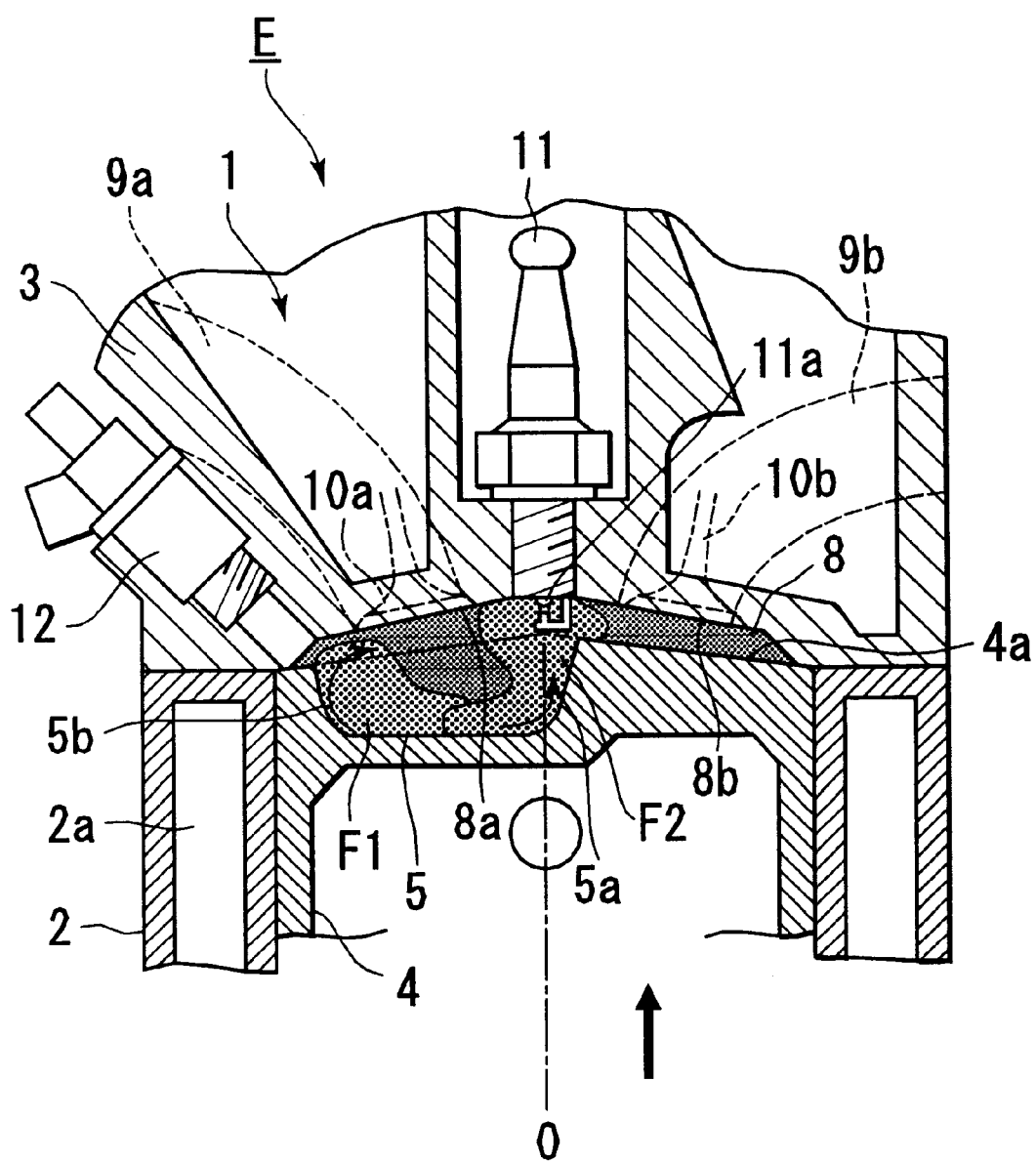
FIG. 7 is a schematic sectional view showing a combustion chamber, particularly a behavior of a fuel spray block at a stage immediately before the expansion stroke in the stratified charge combustion.

FIG. 7 is a sectional view showing a behavior of a fuel spray block immediately before the combustion stroke in the stratified charge combustion. When fuel is injected to the combustion chamber 8 at the latter stage of the combustion stroke, Since the main spray block F1 collides with the inner wall of the cavity 5 at an acute angle, atomization and vaporization of fuel is expedited. The greater part of the main spray block F1 is diffused toward the upper space of the combustion chamber 8 on the intake side along the inner wall surface 5b on the intake side of the cavity 5. As a result, a rich air-fuel mixture is formed on the intake side with respect to the central axis C of the cylinder 1.

On the other hand, the greater part of the subsidiary spray block F2 is diffused towards the upper space of the central combustion chamber 8 along the inner wall surface 5a of the cavity 5 and a rich air-fuel mixture is formed around the electrode 11a of the spark plug 11. The rest main spray block F1 and subsidiary spray block F2 are overlapped with each other and stay in the cavity 5 in a state of stratified air-fuel mixture. Thus, the combustion chamber 8 on the intake side including an area around the electrode 11a of the spark plug 11 is filled with a rich air-fuel mixture and the stratified air-fuel mixture is formed in the cavity 5. Further, the combustion chamber 8 on the exhaust side is filled with a lean air-fuel mixture. As a result, when the spark plug 11 is ignited, a smooth flame propagation takes place, thereby misfirings can be prevented. Furthermore, since an unburned fuel caused in the prior art can be eliminated in the present invention. As a result, emissions of good quality and improved fuel economy can be obtained. Further, as described above, since the main spray block F1 collides with the inner wall of the cavity 5 at an acute angle, atomization and vaporization of fuel is expedited and even in the stratified charge combustion on a high speed region side, a good combustion takes place.

Figure 8:
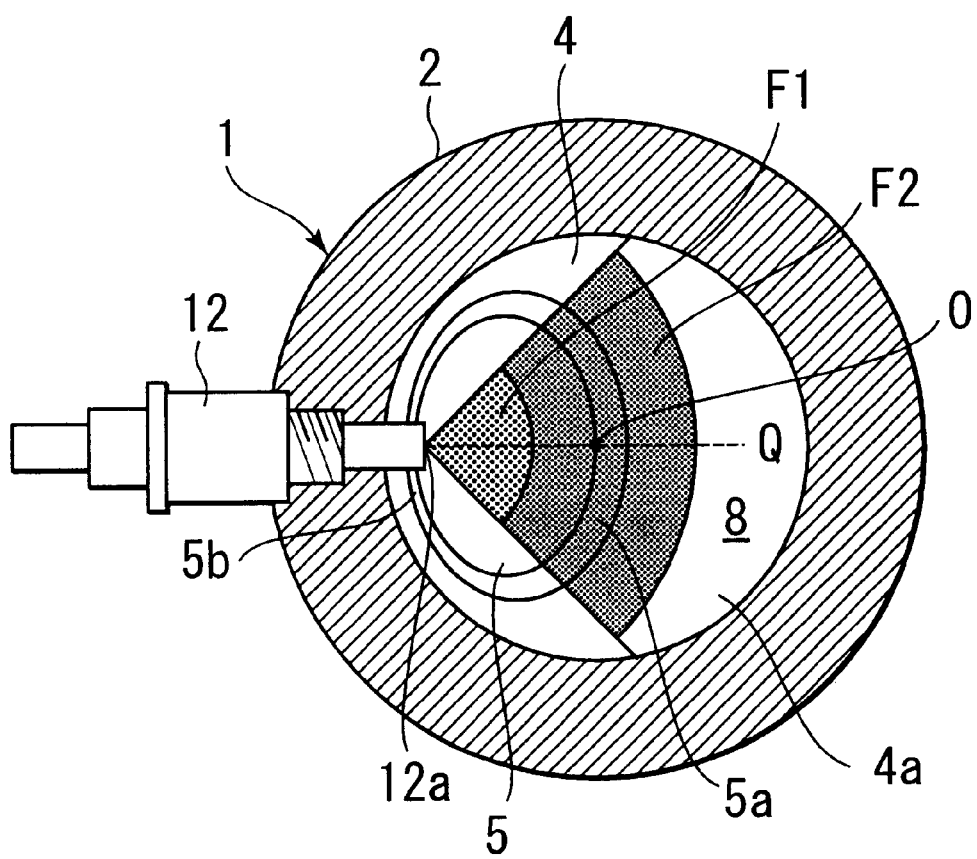
FIG. 8 is a plan view showing a fuel spray block.
Figure 9:
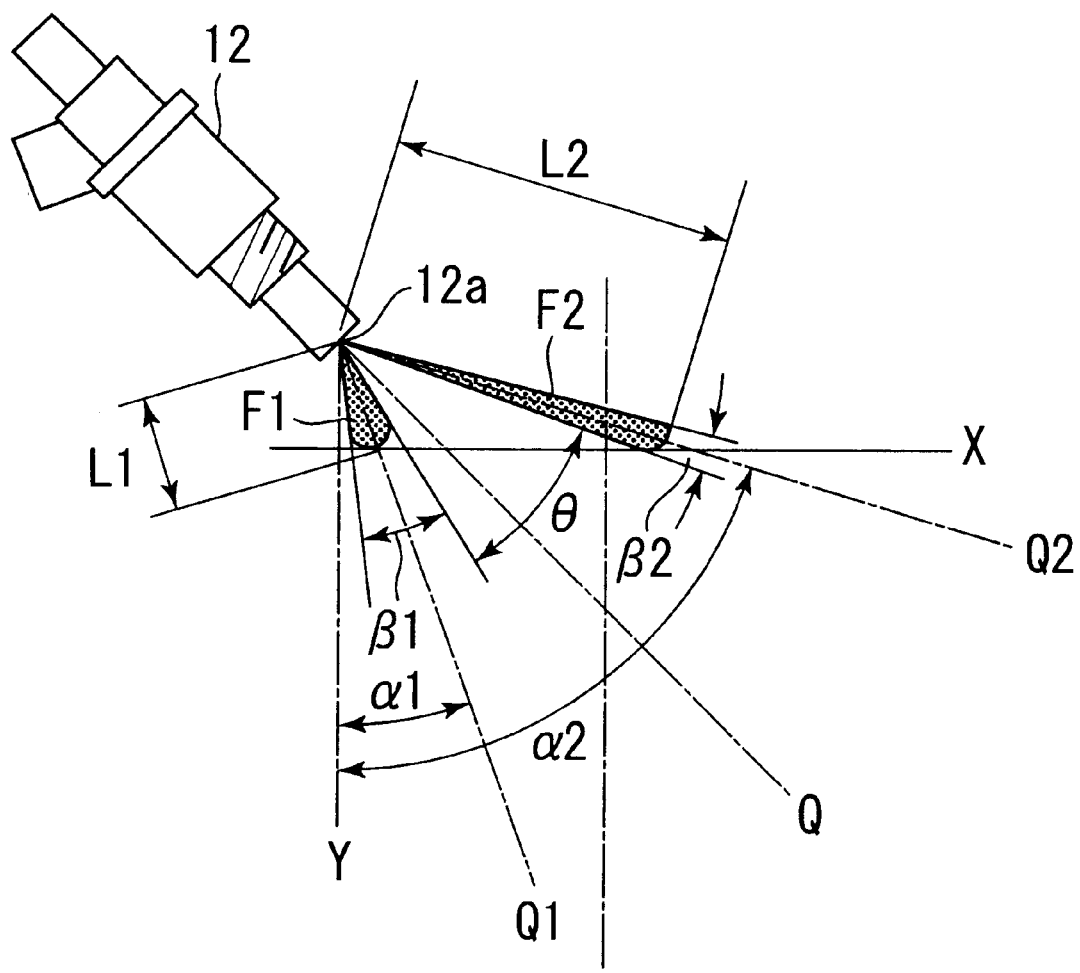
FIG. 9 is an explanatory view showing a penetration of a fuel spray block.

FIG. 8 is a plan view showing a fuel spray block and FIG. 9 is an explanatory view showing a penetration of the fuel spray block. As shown in FIG. 8, the main and subsidiary spray blocks F1, F2 have a fan shaped configuration spreading. towards the central axis O of the cylinder 1 from the injection nozzle 12a of the fuel injector 12 in a symmetrical manner with respect to the center axis Q of the fuel injector 12. As shown in FIG. 9, the main spray block F1 has a correlation expressed by the following formulas (1), (2) with the subsidiary spray block F2:

$$L1 \cos \alpha 1 = L2 \cos \alpha 2 \quad (1)$$

$$\beta 1 > \beta 2 \quad (2)$$

where L1 is a penetration of the main spray block, L2 is a penetration of the subsidiary spray block, $\alpha 1$ is an injection angle of the main spray block, $\alpha 2$ is an injection angle of the subsidiary spray block, $\beta 1$ is a spray angle of the main spray block and $\beta 2$ is a spray angle of the subsidiary spray block.

In the above formulas, the penetration L1 is a reach of the main spray block or a distance along the central axis Q1 from the injection nozzle 12a to a horizontal plane X corresponding to the top surface 4a of the piston 4 and the penetration L2 is a reach of the subsidiary spray block or a distance along the central axis Q2 from the injection nozzle 12a to a horizontal plane X corresponding to the top surface 4a of the piston 4. The injection angle $\alpha 1$ is an angle of the central axis Q1 of the main spray block F1 with respect to a vertical axis Y passing through the injection nozzle 12a of the fuel injector 12 in parallel with the central axis of the cylinder 1. The injection angle $\alpha 2$ is an angle of the central axis Q2 of the subsidiary spray block F2 with respect to a vertical axis Y passing through the injection nozzle 12a of the fuel injector 12 in parallel with the central axis of the cylinder 1. The spray angle $\beta 1$ is a spread angle of the main spray block F1 directed to the central axis O of the cylinder 1 and the spray angle $\beta 2$ is a spread angle of the subsidiary spray block F2 directed to the central axis O of the cylinder 1.

The main spray block F1 and the subsidiary spray block F2 are so designed as to reach the top surface 4a of the piston 4 simultaneously. The reason is as follows. The reach L1 of the main spray block F1 is shorter than the reach L2 of the subsidiary spray block F2 (L1<L2). If the main spray block F1 reaches the top surface 4a of the piston 4 earlier than the subsidiary spray block F2 under the same injection quantity ratio, the main spray block F1 supplies excess fuel to the cavity 5 and fuel is distributed heterogeneously around the cavity 5. To prevent the main spray block F1 from reaching the top surface 4a earlier than the subsidiary spray block 4a, the spray angle $\beta 1$ of the main spray block F1 is established to be larger than the spray angle $\beta 1$ of the subsidiary spray block F2 ($\beta 1 > \beta 2$). As a result, the main spray block F1 and the subsidiary spray block F2 can reach the top surface 4a of the piston 4 simultaneously and the excessive fuel supply to the cavity 5 can be prevented.

Figure 17:
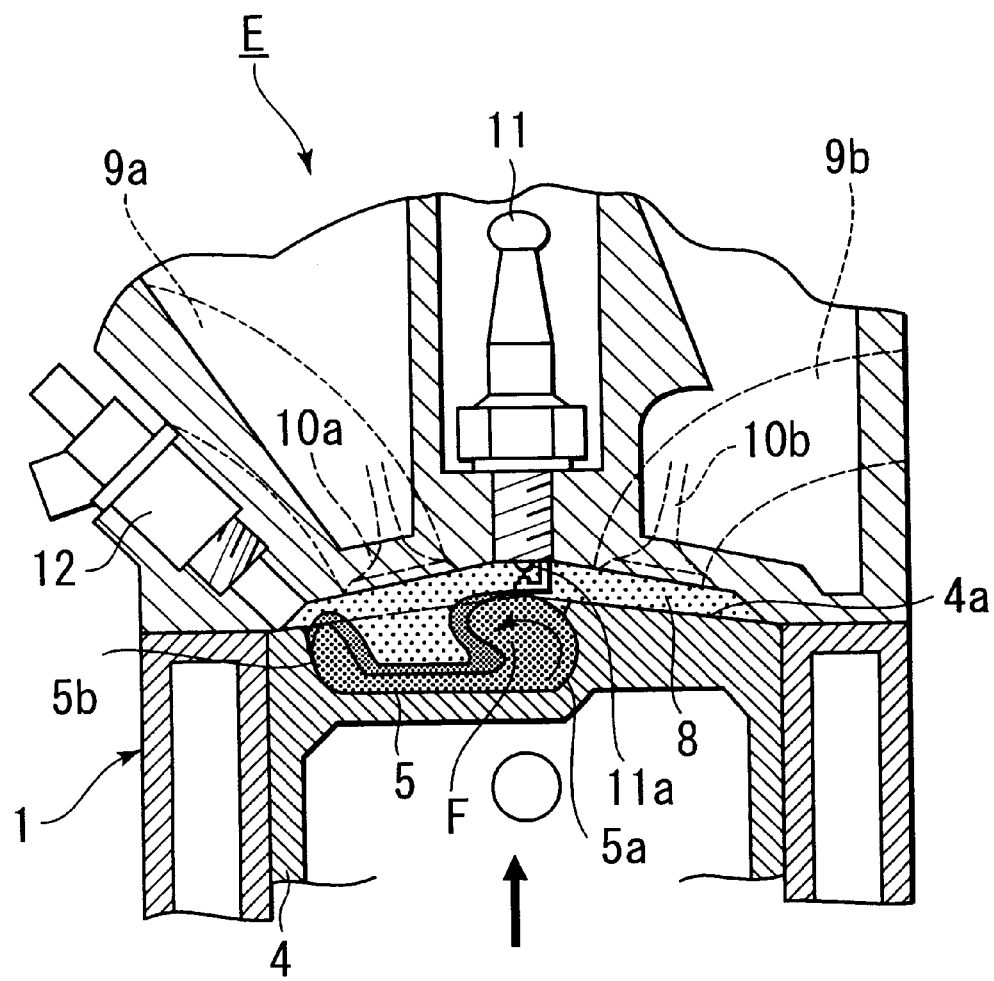
FIG. 17 is a schematic sectional view showing a combustion chamber, particularly a condition of fuel diffused at a stage immediately before the expansion stroke in the stratified charge combustion according to still another prior art.

The ratio of injection quantity of the main spray block F1 to that of the subsidiary spray block F2 is established according to a ratio of the volume of the cavity 5 to the volume excepting the cavity 5 of the combustion chamber 8 at the top dead center. In this case, the definition of the volume of the cavity 5 and the volume excepting the cavity 5 of the combustion chamber 8 varies depending upon the configuration of the cavity 5. For example, as shown in FIG. 3, the cavity whose inner wall surface 5a on the exhaust side is outwardly open is referred to as an open wall type cavity. Further, as shown in FIG. 17, the cavity whose inner wall surface 5a on the exhaust side is shaped into an overhang configuration is referred to as an overhung wall type cavity. In case of the open wall type cavity, the volume of the cavity 5 is defined as a volume of the cavity 5 itself plus a volume of an upper space of the cavity 5 up to the roof surface 8a on the intake side and the volume excepting the cavity is defined as a volume of the other space of the combustion chamber 8. On the other hand, in case of the overhung wall type cavity, when the spray block F collides with the inner wall surface 5a, the greater part of the spray block F flows towards the intake side and stays in the cavity 5. Hence, the volume of the cavity is defined as a volume of the cavity 5 itself and the volume excepting the cavity is defined as a volume of all other space of the combustion chamber 8. Thus, the ratio of injection quantity of the main spray block F1 to that of the subsidiary spray block F2 is established according to a ratio of the defined volume of the cavity 5 to the defined volume excepting the cavity 5.

Further, the space between the main spray block F1 and the subsidiary spray block F2 plays an important role to expedite mixing of fuel and air. In this embodiment, as shown in FIG. 9, the injection angle al of the main spray block F1 is established according to the configuration of the combustion chamber 8 so as to maintain a spacing angle $\theta$ of the space between the main spray block F1 and the subsidiary spray block F2 at 10° and more.

Figure 10:
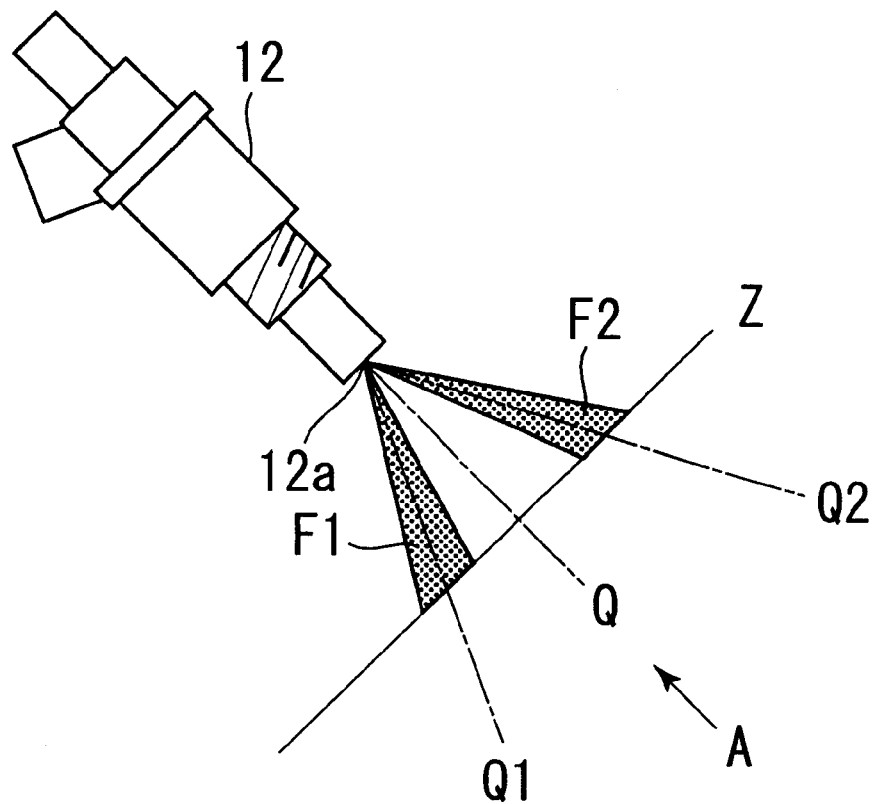
FIG. 10 is a side view showing two fuel spray blocks.
Figure 11A:
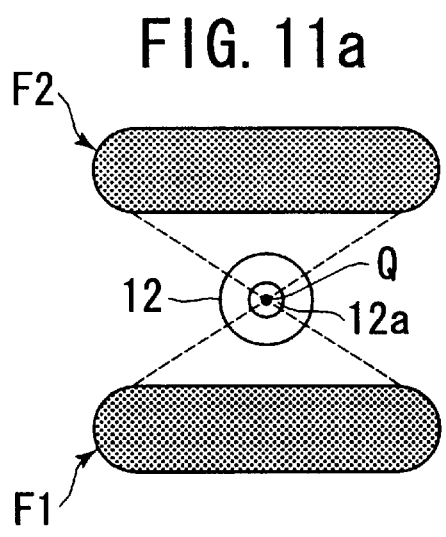
FIGS. 11a and 11b are schematic sectional views showing fuel spray blocks of FIG. 10 taken along a plane perpendicular to a central axis of a fuel injector according to a first embodiment.
Figure 11B:
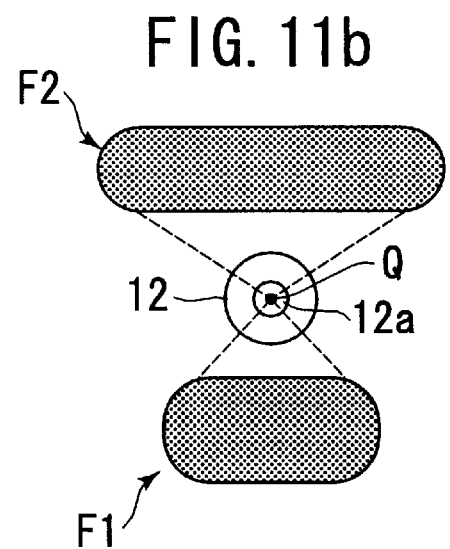

FIG. 10 is a side view showing a fuel injection. In the drawing, Z denotes a plane perpendicular to the central axis Q of the fuel injector 12. Further, FIGS. 11a and 11b are sectional views of examples of fuel injection modes taken along the plane Z of FIG. 10 as viewed from an arrow A according to the first embodiment. That is, in this embodiment, fuel injected from the fuel injector 12 forms two spray blocks, the main spray block F1 and the subsidiary spray block F2. Specifically, FIG. 11a shows a fuel injection mode in which the main spray block F1 and the subsidiary spray block F2 have a similar belt-shaped section, respectively. FIG. 11b shows a fuel injection mode in which the main spray block F1 and the subsidiary spray block F2 have a belt-shaped section differing in length and width from each other, respectively.

Figure 11C:
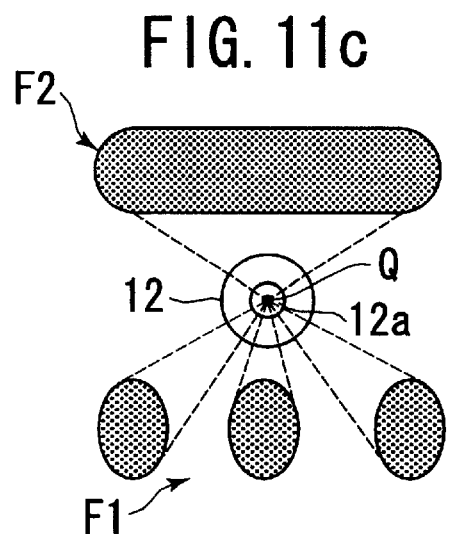
FIGS. 11c to 11e are schematic sectional views showing fuel spray blocks taken along a plane perpendicular to a central axis of a fuel injector according to a second embodiment.
Figure 11D:
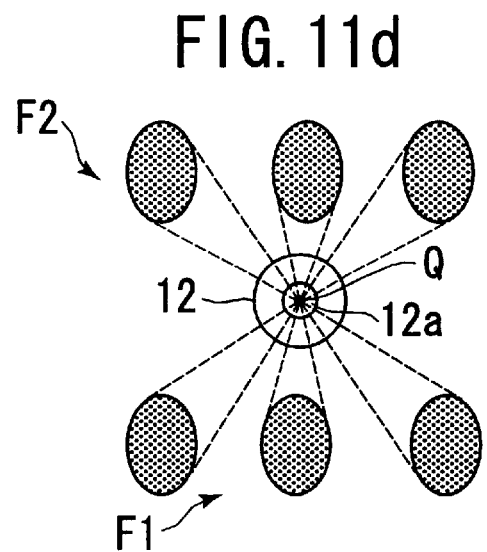
Figure 11E:
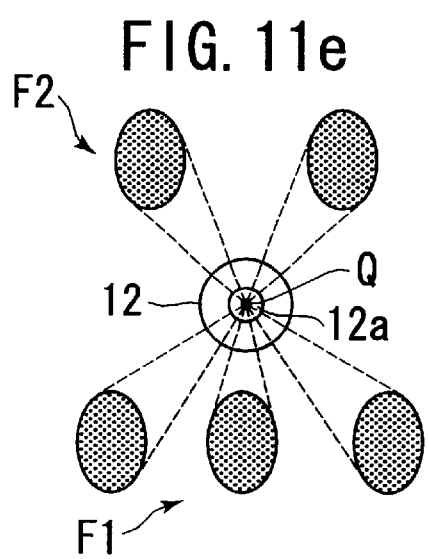
Figure 12:
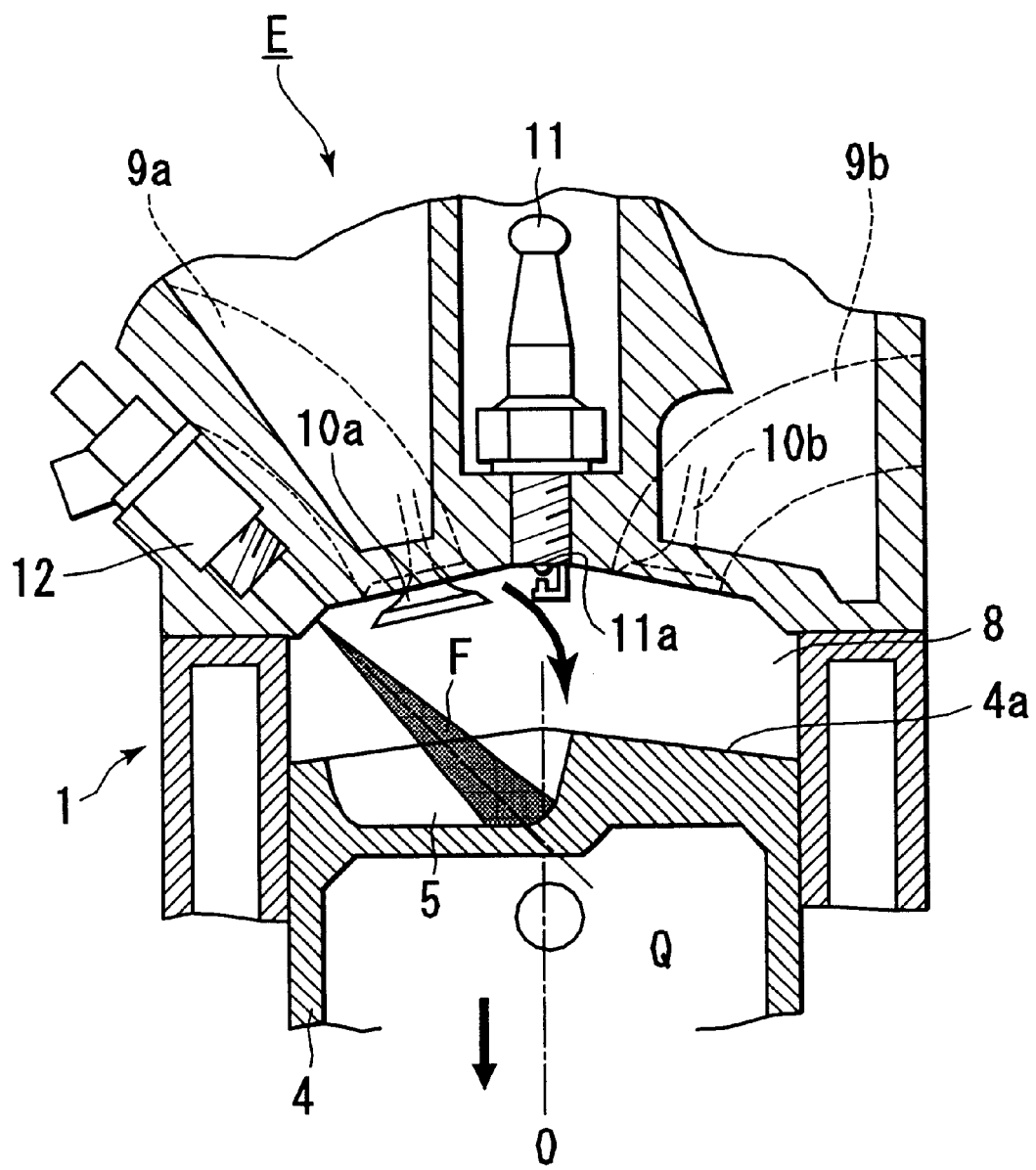
FIG. 12 is a schematic sectional view showing a combustion chamber, particularly a condition of fuel injected at a middle stage of the intake stroke in the homogeneous charge combustion according to a prior art.
Figure 13:
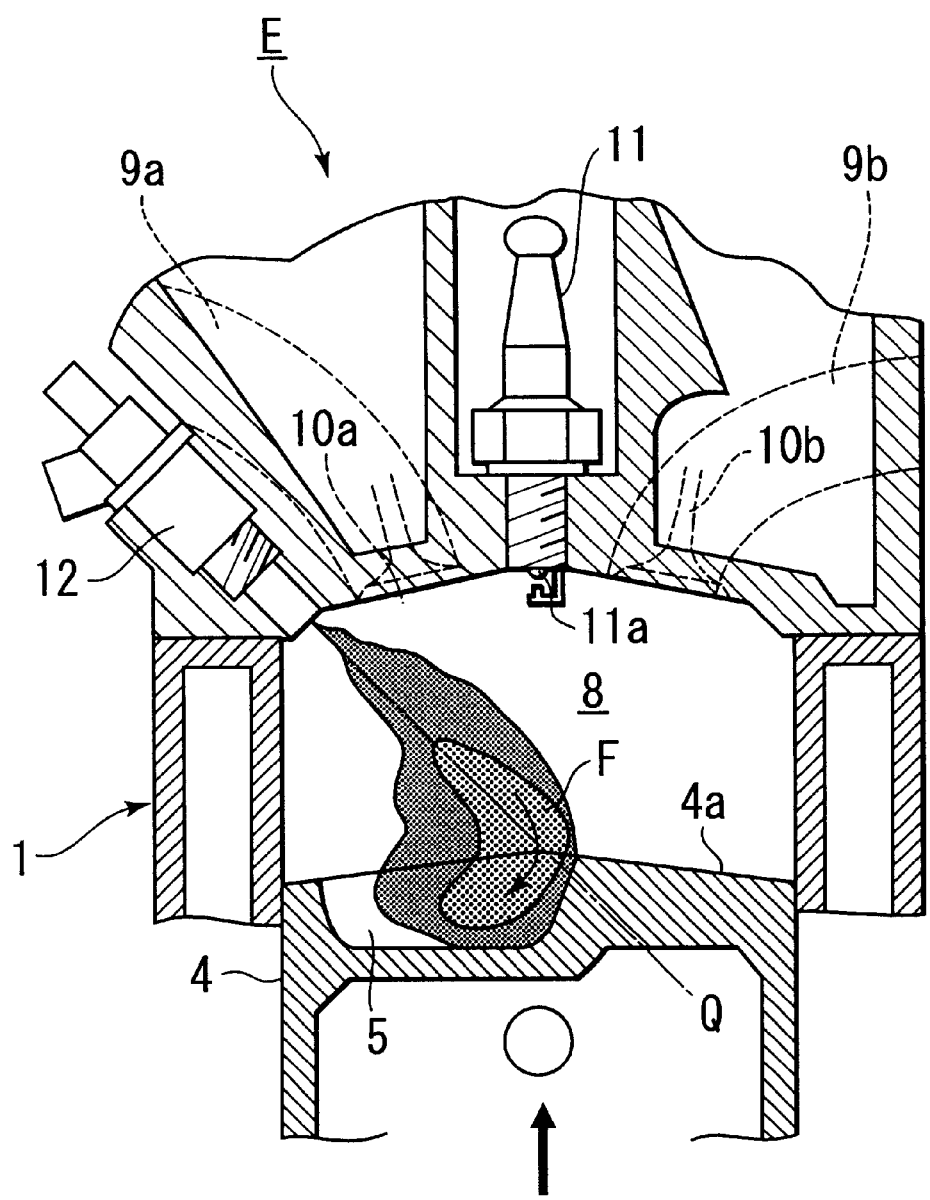
FIG. 13 is a schematic sectional view showing a combustion chamber, particularly a condition of fuel diffused at an initial stage of the compression stroke in the homogeneous charge combustion according to a prior art.
Figure 14:
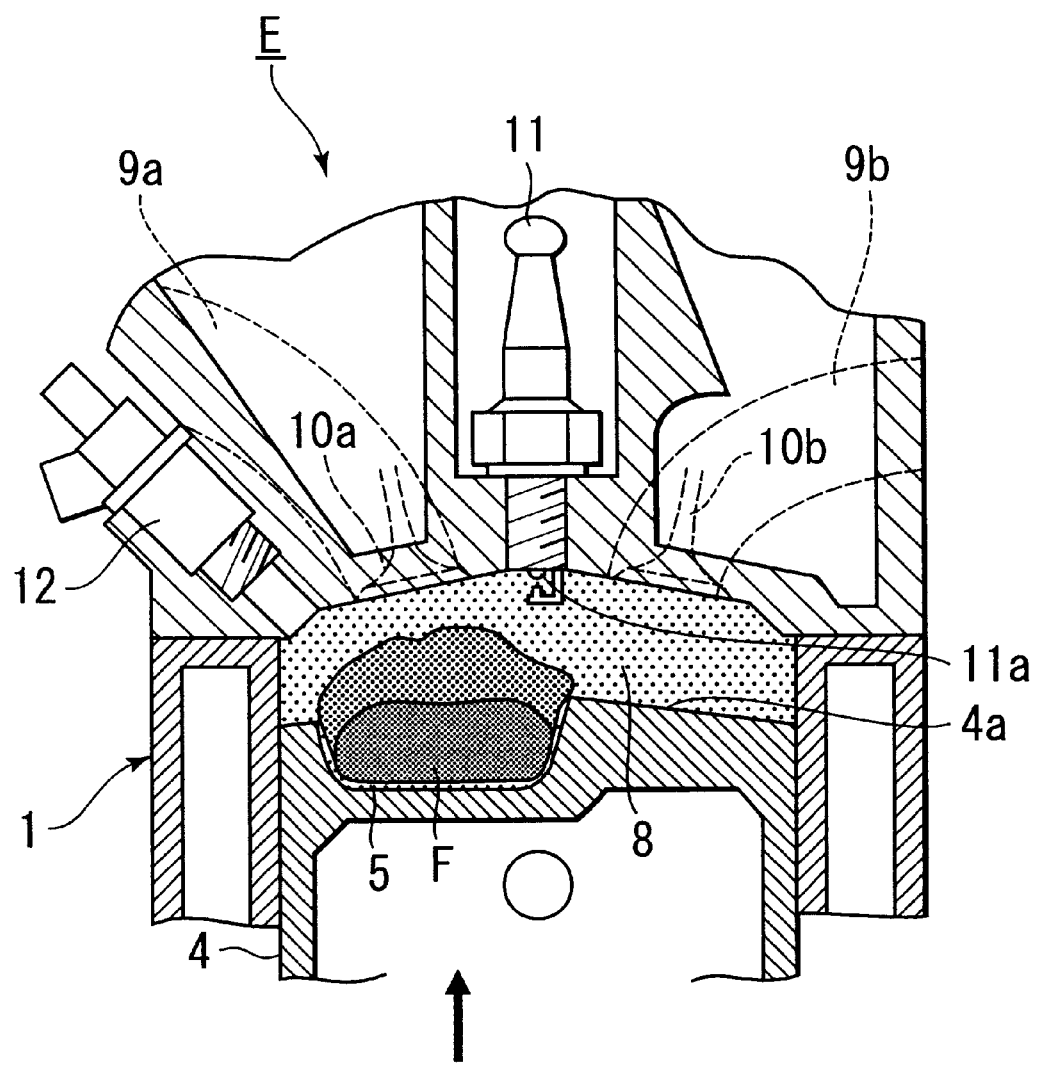
FIG. 14 is a schematic sectional view showing a combustion chamber, particularly a condition of fuel diffused at a latter stage of the compression stroke in the homogeneous charge combustion according to a prior art.
Figure 15:
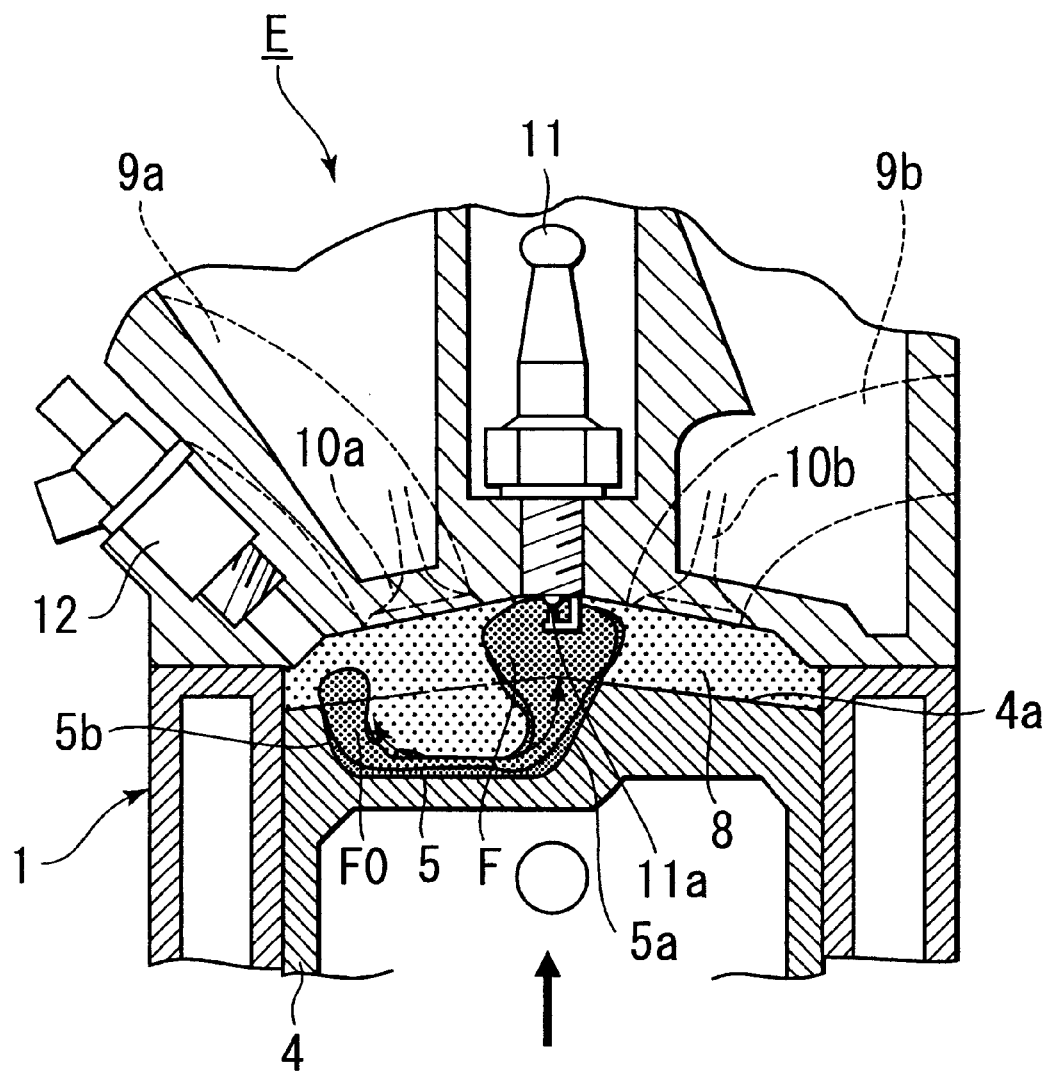
FIG. 15 is a schematic sectional view showing a combustion chamber, particularly a condition of fuel diffused at a latter stage of the compression stroke in the stratified charge combustion according to a prior art.
Figure 16:
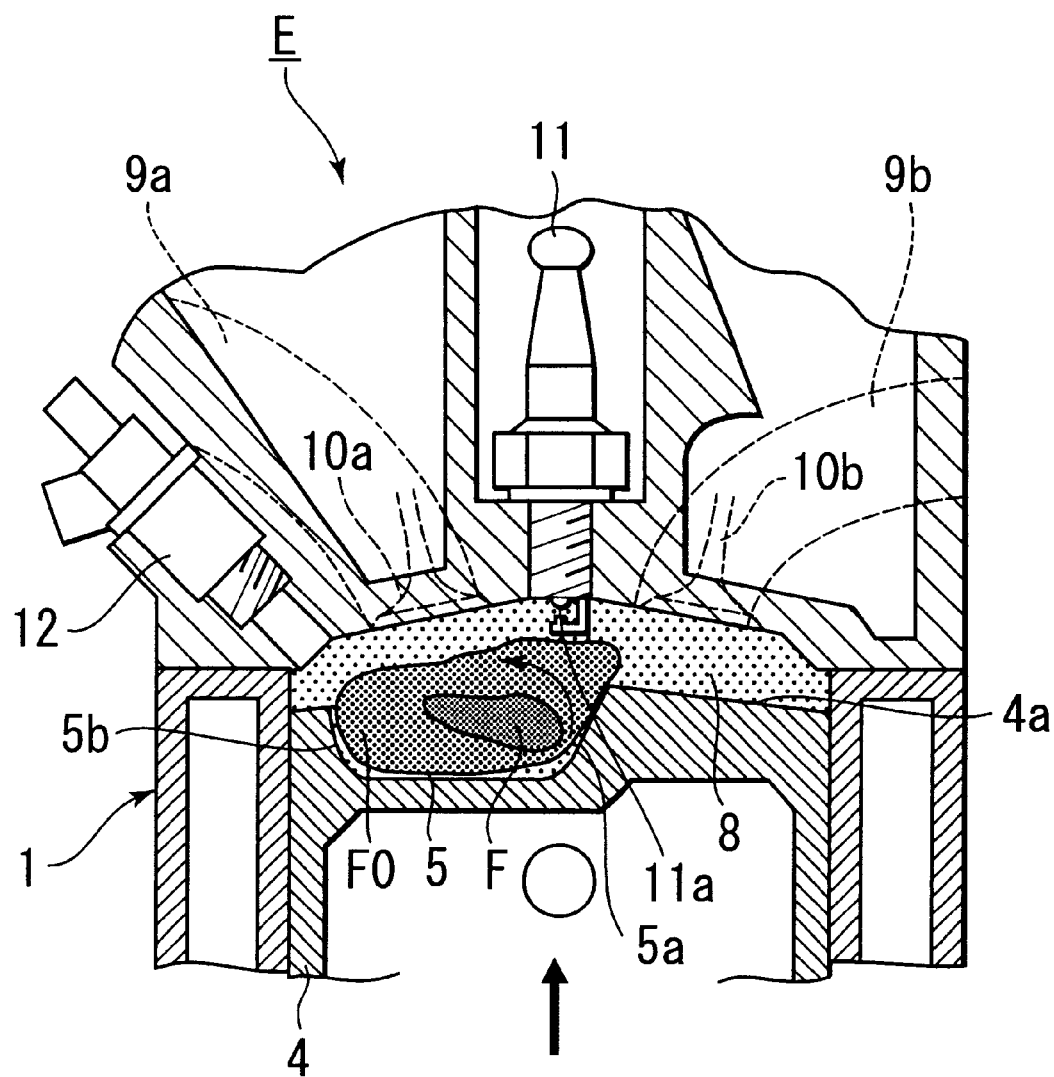
FIG. 16 is a schematic sectional view showing a combustion chamber, particularly a condition of fuel diffused at a stage immediately before the expansion stroke in the stratified charge combustion according to another prior art.

FIGS. 11c to 11e are sectional views of examples of fuel injection modes taken along the plane Z of FIG. 10 as viewed from an arrow A according to the second embodiment. In this embodiment, respective spray blocks, main spray block F1 and subsidiary spray block F2, are divided into a plurality of spray blocks, forming a first group of fuel spray blocks and a second group of fuel splay blocks. Specifically, FIG. 11c shows a fuel injection mode in which the main spray block F1 or the first group of spray blocks is divided into three spray blocks having round sections (elliptic sections as viewed from Z plane) arranged in line and the subsidiary spray block F2 or the second group of spray blocks has a belt-shaped section. FIG. 11d shows a fuel injection mode in which the main spray block F1 or the first group of spray blocks and the subsidiary spray block F2 or the second group of spray blocks is divided into three spray blocks having round sections arranged in line, respectively. Further, FIG. 11e shows a fuel injection mode in which the main spray block F1 or the first group of spray blocks is divided into two spray blocks having round sections and the subsidiary spray block F2 or the second group of spray blocks is divided into three spray blocks having round sections.

The entire contents of Japanese Patent Application No. Tokugan 2002-171480 filed Jun. 12, 2002, is incorporated herein by reference.

While the present invention has been disclosed in terms of the preferred embodiments in order to facilitate better understanding of the invention, it should be appreciated that the invention can be embodied in various ways without departing from the principle of the invention. Therefore, the invention should be understood to include all possible embodiments which can be embodied without departing from the principle of the invention set out in the appended claims.

What is claimed is:

1. An in-cylinder fuel injection engine for injecting fuel directly into a cylinder, comprising:

a cavity provided on a top surface of a piston on an intake side;

a fuel injector for forming two fuel spray blocks, a first fuel spray block and a second fuel spray block; and injection timing control means for controlling an injection timing so as to direct said first fuel spray block to said cavity and to direct said second fuel spray block to said top surface of said piston outside of said cavity, when said piston is during the intake stroke and positioned at a specified crank angle after top dead center on a bottom dead center side and for controlling said injection timing so as to direct both of said first and second fuel spray blocks to said cavity, when said piston is at a latter stage of the compression stroke.

2. The in-cylinder fuel injection engine according to claim 1, wherein said specified crank angle is between 100° and 180°, preferably 130° and 160°.

3. The in-cylinder fuel injection engine according to claim 1, wherein said first fuel spray block is spaced from said second fuel spray block by more than 10°.

4. An in-cylinder fuel injection engine capable of selecting a homogeneous charge combustion or a stratified charge combustion according to an engine operating condition, comprising:

a cavity provided on a top surface of a piston on an intake side;

a fuel injector for forming two fuel spray blocks, a first spray block and a second fuel spray block; and injection timing control means for controlling an injection timing so as to direct said first fuel spray block to said cavity and to direct said second fuel spray block to said top surface of said piston outside of said cavity, when said homogeneous charge combustion takes is performed and for controlling said injection timing so as to direct both of said first and second fuel spray blocks to said cavity, when said stratified charge combustion is performed.

5. A method of controlling an in-cylinder fuel injection engine having a cavity on a top surface of a piston and a fuel injector for injecting fuel into a cylinder, said engine capable of selecting a homogeneous charge combustion or a stratified charge combustion according to an engine operating condition, comprising the steps of:

forming two fuel spray blocks, a first fuel spray block and a second fuel spray block; and controlling an injection timing so as to direct said first fuel spray block to said cavity and to direct said second fuel spray block to said top surface of said piston outside of said cavity, when said homogeneous charge combustion is performed and for controlling said injection timing so as to direct both of said first and second fuel spray blocks to said cavity, when said stratified charge combustion is performed.

6. An in-cylinder fuel injection engine for injecting fuel directly into a cylinder, comprising:

a cavity provided on a top surface of a piston on an intake side;

a fuel injector for forming two groups of fuel spray blocks, a first group of fuel spray blocks including a plurality of spray blocks and a second group of fuel spray blocks including a plurality of spray blocks; and injection timing control means for controlling an injection timing so as to direct said first group of fuel spray blocks to said cavity and to direct said second group of fuel spray blocks to said top surface of said piston outside of said cavity, when said piston is during the intake stroke and positioned at a specified crank angle after top dead center on a bottom dead center side and for controlling said injection timing so as to direct both of said first and second groups of fuel spray blocks to said cavity, when said piston is at a latter stage of the compression stroke.

7. The in-cylinder fuel injection engine according to claim 6, wherein said specified crank angle is between 100° and 180°, preferably 130° and 160°.

8. The in-cylinder fuel injection engine according to claim 6, wherein said first group of fuel spray blocks is spaced from said second group of fuel spray blocks by more than 10°.

9. An in-cylinder fuel injection engine capable of selecting a homogeneous charge combustion or a stratified charge combustion according to an engine operating condition, comprising:

a cavity provided on a top surface of a piston on an intake side;

a fuel injector for forming two groups of fuel spray blocks, a first group of spray blocks including a plurality of spray blocks and a second group of fuel spray blocks including a plurality of spray blocks; and injection timing control means for controlling an injection timing so as to direct said first group of fuel spray blocks to said cavity and to direct said second group of fuel spray blocks to said top surface of said piston outside of said cavity, when said homogeneous charge combustion is performed and for controlling said injection timing so as to direct both of said first and second groups of fuel spray blocks to said cavity, when said stratified charge combustion is performed.

10. A method of controlling an in-cylinder fuel injection engine having a cavity on a top surface of a piston and a fuel injector for injecting fuel into a cylinder, said engine capable of selecting a homogeneous charge combustion or a stratified charge combustion according to an engine operating condition, comprising the steps of:

forming two groups of fuel spray blocks, a first group of fuel spray blocks including a plurality of spray blocks and a second group of fuel spray blocks including a plurality of spray blocks; and controlling an injection timing so as to direct said first group of fuel spray blocks to said cavity and to direct said second group of fuel spray blocks to said top surface of said piston outside of said cavity, when said homogeneous charge combustion is performed and for controlling said injection timing so as to direct both of said first and second groups of fuel spray blocks to said cavity, when said stratified charge combustion is performed.

* * * * *